US009654420B2

(12) United States Patent
Kariya (10) Patent No.: US 9,654,420 B2
(45) Date of Patent: May 16, 2017

(54) RELAY DEVICE (71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

(*) Notice: Subject to any disclaimer, the term of this patent is extended or adjusted under 35 U.S.C. 154(b) by 177 days.

(21) Appl. No.: 14/510,168

(22) Filed: Oct. 9, 2014

(65) Prior Publication Data
US 2015/0358255 A1 Dec. 10, 2015

(30) Foreign Application Priority Data

Jun. 4, 2014 (JP) ................................. 2014-116218

(51) Int. Cl.
*H04L 12/26* (2006.01)
*H04L 12/931* (2013.01)
*H04L 12/935* (2013.01)

(52) U.S. Cl.
CPC ........ *H04L 49/351* (2013.01); *H04L 43/0811* (2013.01); *H04L 43/50* (2013.01); *H04L 49/30* (2013.01)

(58) Field of Classification Search
None
See application file for complete search history.

(56) References Cited

U.S. PATENT DOCUMENTS

2011/0149986 A1 6/2011 Sugawara
2014/0140219 A1* 5/2014 Yamada ................... H04L 1/22
370/242

FOREIGN PATENT DOCUMENTS

JP 2011-130155 A 6/2011

* cited by examiner

*Primary Examiner* — Rhonda Murphy
(74) *Attorney, Agent, or Firm* — Crowell & Moring LLP (57) ABSTRACT One external ports of the line cards are set as member ports of the same LAG. When monitoring a continuity between the member ports of the LAG and an outside of the device, a management card generates a first monitoring frame and transmits it to any line card corresponding to the LAG. The line card transmits the first monitoring frame to the outside of the device from the external port. When the line cards corresponding to the LAG receive a second monitoring frame from the outside of the device by the LAG, the line cards transmit the second monitoring frames to the management card.

3 Claims, 8 Drawing Sheets

RELAY DEVICE

CROSS-REFERENCE TO RELATED APPLICATION

The present application claims priority from Japanese Patent Application No. 2014-116218 filed on Jun. 4, 2014, the content of which is hereby incorporated by reference into this application.

TECHNICAL FIELD OF THE INVENTION

The present invention relates to a relay device, for example, a chassis-type relay device having functions of Ethernet (Registered Trademark) OAM.

BACKGROUND OF THE INVENTION

For example, Japanese Patent Application Laid-Open Publication No. 2011-130155 (Patent Document 1) discloses the process contents at the occurrence of flooding in a chassis-type switching hub in which the LAG (Link Aggregation Group) across line cards is set. Concretely, at the occurrence of flooding, a line card on an ingress side adds a distribution ID to a frame and transmits it to each line card on an egress side. Each line card on an egress side retains a table representing a correspondence relation between a distribution ID and a port ID (including line card ID), and when the line card ID corresponding to the distribution ID added to the received frame indicates the line card itself, the line card transmits a frame from a port corresponding to the port ID.

SUMMARY OF THE INVENTION

For example, as described in the Patent Document 1, a so-called chassis-type relay device (in other words, switching device) in which a plurality of line cards are mounted in one chassis has been known. Usually, the relay device is provided with a management card for managing the whole relay device including the management of setting, conditions and others of each line card in addition to the plurality of line cards. Also, as described in the Patent Document 1, the LAG across line cards is set to the plurality of line cards in some cases.

On the other hand, in the Ethernet (Registered Trademark) network, a maintenance/administration function called Ethernet OAM (Operations, Administration and Maintenance) has been widely used. The Ethernet OAM is standardized as "ITU-T Y. 1731", "IEEE802.1ag" and others. In the Ethernet OAM, a function referred to as CC (Continuity Check) is defined as one of its representative functions. This is a function of monitoring continuity between monitoring points called MEP (Maintenance End Point) by transmitting and receiving a frame called CCM (Continuity Check Message) (hereinafter, referred to as CCM frame) between the monitoring points at regular intervals. For example, when the CCM frame cannot be received between MEPs within a predetermined period, it is determined that there is no continuity between the MEPs.

Here, the case where the functions of Ethernet OAM are mounted on the chassis-type relay device in which the LAG across line cards is set is assumed. As one of mounting methods thereof, for example, a method of transmitting and receiving a CCM frame between each line card serving as a main part and the outside of the device has been known. However, when the MEP is set to the LAG across line cards, it is necessary to monitor whether the CCM frame is received or not as the LAG. To that end, a mechanism capable of sharing the reception state of the CCM frame among a plurality of line cards to which the LAG is set is necessary. In particular, in the chassis-type relay device, usually, it is necessary that many ports are provided and many MEPs can be set. However, depending on the processing capacity of the line card, such needs cannot be sufficiently satisfied in some cases, and there is a threat that the needs further cannot be satisfied if the above-described mechanism to share the reception state is provided.

The present invention has been made in view of the problem mentioned above, and one object of the present invention is to provide a chassis-type relay device capable of achieving the increase of the monitoring points based on the Ethernet OAM.

The above and other objects and novel characteristics of the present invention will be apparent from the description of the present specification and the accompanying drawings.

The following is a brief description of an outline of the typical embodiment of the invention disclosed in the present application.

The relay device of the present embodiment includes: a plurality of line cards each having one or plural external ports; and a first card connected to each of the plurality of line cards. An external port of one of the plurality of line cards and an external port of the other one of the plurality of line cards are set as member ports of the same LAG. When monitoring a continuity between the member ports of the LAG and an outside of the device, the first card generates a first monitoring frame and transmits it to the line cards having the member ports of the LAG. Any one of the line cards having the member ports of the LAG transmits the first monitoring frame received from the first card to the outside of the device from its own external port set as the member port of the LAG. When the line cards having the member ports of the LAG receive a second monitoring frame from the outside of the device at their own external ports set as the member ports of the LAG, they transmit the received second monitoring frame to the first card.

The effects obtained by typical embodiments of the invention disclosed in the present application will be briefly described below. That is, it is possible to achieve the increase of the monitoring points based on the Ethernet OAM in the chassis-type relay device.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

Outline of Relay System

Figure 1:
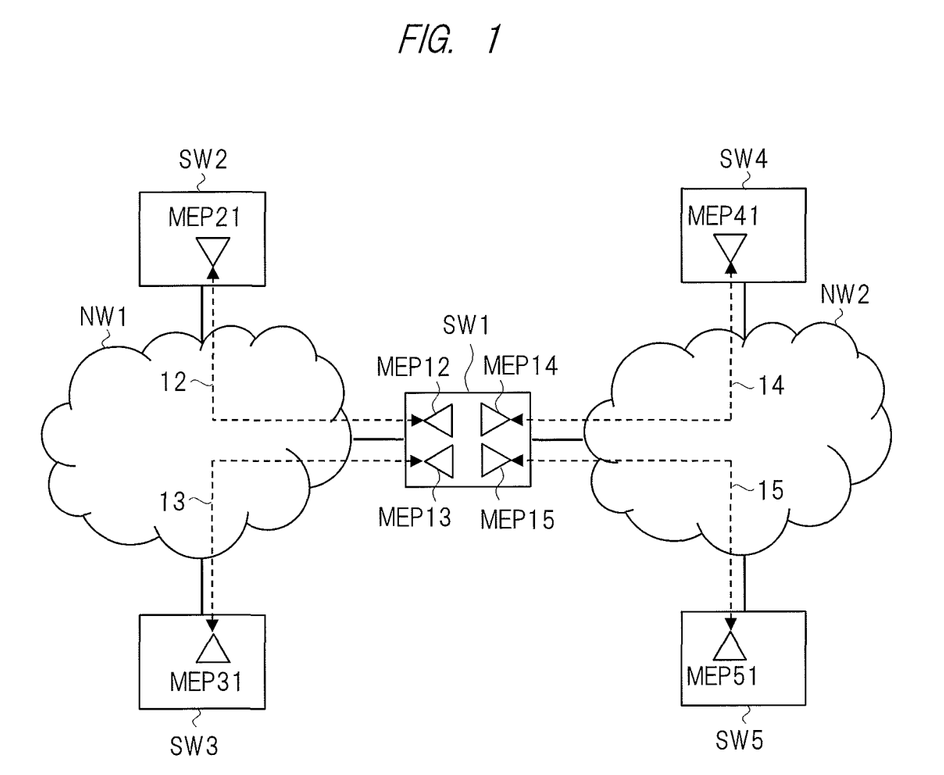
FIG. 1 is a schematic diagram showing a configuration example of a relay system to which a relay device according to the first embodiment of the present invention is applied.

FIG. 1 is a schematic diagram showing a configuration example of a relay system to which a relay device according to the first embodiment of the present invention is applied. For example, the relay system shown in FIG. 1 includes a plurality of relay devices (switching devices) SW1 to SW5 and a plurality of networks NW1 and NW2. The relay devices SW1 to SW3 are connected to the network NW1 and the relay devices SW1, SW4 and SW5 are connected to the network NW2. Though not particularly limited, the network NW1 serves as a lower side (for example, user side) network and the network NW2 serves as an upper side (for example, communication provider side) network with reference to the relay device SW1.

Each of the relay devices SW1 to SW5 is, for example, a layer 2 (L2) switching device which performs the L2 process based on the OSI reference model, a layer 3 (L3) switching device which performs the L3 process, or the like. In this embodiment, the case where each of the relay devices SW1 to SW5 is the L2 switching device is taken as an example. Each of the relay devices SW1 to SW5 has the functions of Ethernet OAM, and monitoring points (that is, MEP) based on the Ethernet OAM are set to each of the relay devices SW1 to SW5.

In the example of FIG. 1, MEP 12 to MEP 15 are set to the relay device SW1, and MEP 21, MEP 31, MEP 41 and MEP 51 are set to the relay devices SW2, SW3, SW4 and SW5, respectively. The MEP 12 sets a monitoring section 12 between itself and the MEP 21, the MEP 13 sets a monitoring section 13 between itself and the MEP 31, the MEP 14 sets a monitoring section 14 between itself and the MEP 41, and the MEP 15 sets a monitoring section 15 between itself and the MEP 51.

For example, when the continuity is monitored based on the CC function of the Ethernet OAM between the MEPs interposing the monitoring section, each MEP (for example, MEP 12) transmits and receives a CCM frame or the like to and from an opposite MEP (for example, MEP 21) at regular intervals. For example, when the MEP 12 does not receive the CCM frame from the MEP 21 within a predetermined period (for example, 3.5 times as long as the transmission interval of the CCM frame), the MEP 12 determines that the MEP 21 is in a LOC (Loss Of Continuity) state and recognizes that the reception path from the MEP 21 does not have the continuity.

In this case, the MEP 12 transmits the CCM frame to the MEP 21 after attaching a flag to the RDI (Remote Defect Indication) bit contained in the CCM frame. In this specification, the CCM frame having a flag attached to the RDI bit thereof is referred to as CCM (with RDI) frame. The MEP 21 which has received the CCM (with RDI) frame determines that the MEP 12 is in a RDI state and recognizes that the transmission path to the MEP 12 does not have continuity.

Here, though not particularly limited, in the relay device which is disposed at the boundary between networks like the relay device SW1, it is necessary that many MEPs can be set. In order to satisfy such need, the use of the relay device of the present embodiment described later is beneficial. In this embodiment, the case where the continuity is monitored based on the CC function of the Ethernet OAM is taken as an example, but the function is not necessarily limited to the CC function. In the Ethernet OAM, for example, the LB (Loop Back) function and the LT (Link Trace) function using the MEPs are also defined in addition to the CC function, and these functions can also be applied in the same manner.

<<Outline of Relay Device>>

Figure 2:
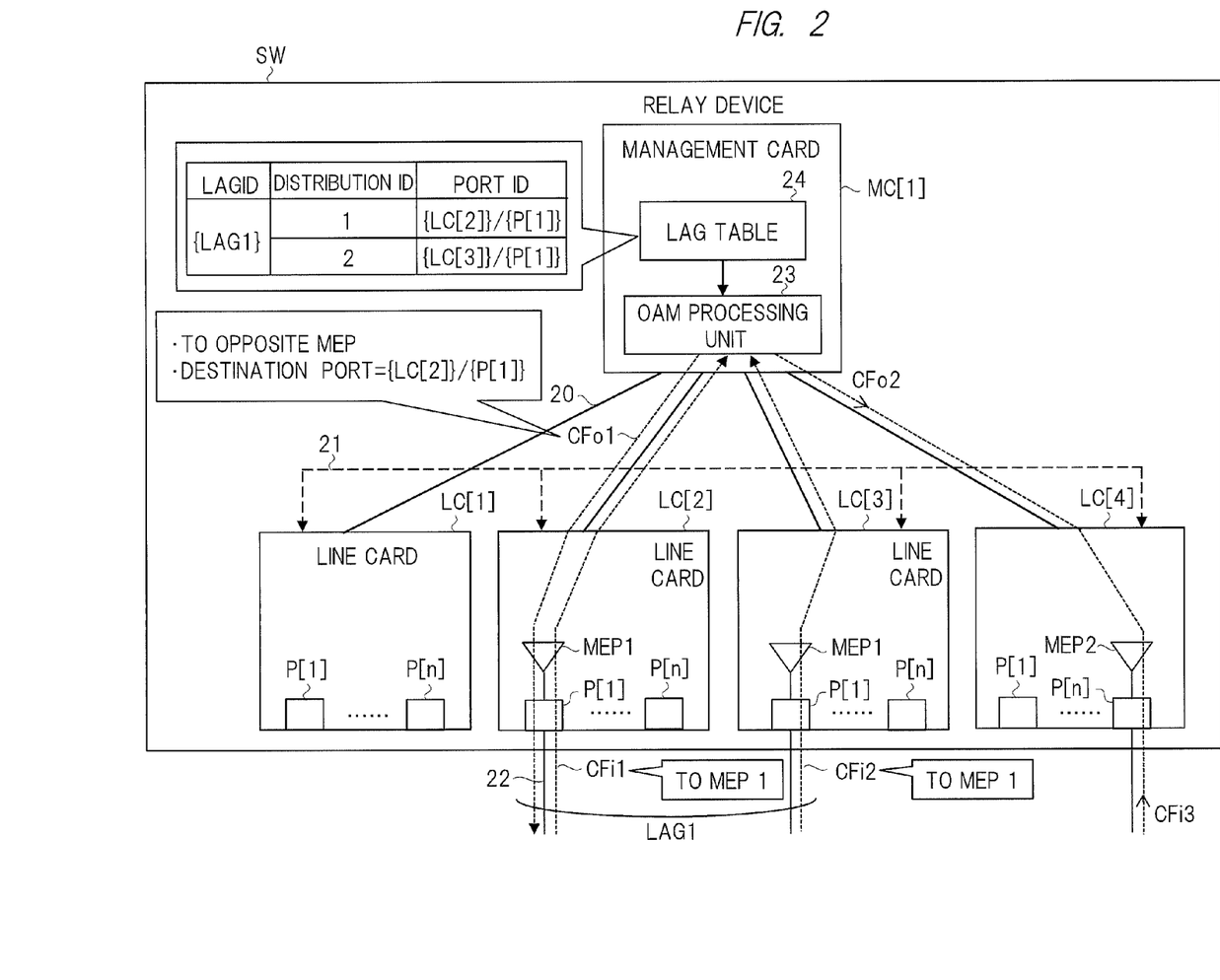
FIG. 2 is a schematic diagram showing a configuration example and an operation example of the relay device according to the first embodiment of the present invention.

FIG. 2 is a schematic diagram showing a configuration example and an operation example of the relay device according to the first embodiment of the present invention. The relay device (switching device) SW shown in FIG. 2 corresponds to any one of the relay devices SW1 to SW5 in FIG. 1. The relay device SW is a chassis-type switching device in which a plurality of (here, four) line cards LC[1] to LC[4] and a management card (first card) MC[1] are provided and mounted in one chassis. Each of the line cards LC[1] to LC[4] has n external ports P[1] to P[n]. However, it is enough if each of the line cards LC[1] to LC[4] has one or plural external ports, and it is not always necessary that each line card has the same number of external ports.

Also, the plurality of line cards LC[1] to LC[4] are connected to each other through a communication path 21 for relaying a frame between the line cards. Although the communication path 21 is shown in a simplified manner in FIG. 2, it may be configured of a communication line connecting the line cards in a mesh fashion or configured of a fabric card in practice. In the latter case, each of the plurality of line cards LC[1] to LC[4] is connected to the fabric card through communication lines and relays a frame to the other line cards through the fabric card.

Here, the external port of any one of the plurality of line cards LC[1] to LC[4] and the external port of the other one of the plurality of line cards are set as member ports of the same LAG. In the example of FIG. 2, the external port P[1] of the line card LC[2] and the external port P[1] of the line card LC[3] are set as member ports of the LAG 1 across the line cards. The member ports of the LAG 1 are virtually (logically) regarded as one port. Here, although the LAG is set across two line cards, the number of line cards is not limited to two, and the LAG may be set across three or more line cards.

The management card (first card) MC[1] is connected to the plurality of line cards LC[1] to LC[4] through management communication lines 20, respectively, and manages the plurality of line cards LC[1] to LC[4] through the communication lines 20. As an example, the management card MC[1] performs the setting of the VLAN (Virtual LAN) and the setting of the filter to determine whether to transmit the frame based on the instruction from the outside of the device to each of the line cards LC[1] to LC[4]. Alternatively, the management card MC[1] monitors the failure status of each of the line cards LC[1] to LC[4] and makes the failure status shared among the line cards LC[1] to LC[4]. The management function like this is implemented by, for example, a processor unit (CPU) (not shown) mounted in the management card MC[1].

The management card MC[1] includes an OAM processing unit 23 which performs the process of the Ethernet OAM and a LAG table 24 in addition to the management function described above. Though not particularly limited, the OAM processing unit 23 is configured of dedicated hardware different from the processor unit (CPU). The LAG table 24 retains a correspondence relation between the LAG (here, LAG identifier (LAD ID)) and the member port of the LAG (here, port identifier of the member port (port ID)). Further, though not particularly limited, the LAG table 24 retains a distribution identifier (distribution ID) assigned to each member port. The port ID is made up of the identifier of the line card and the identifier of the external port.

The example of the LAG table 24 in FIG. 2 shows that the LAG 1 is composed of the external port P[1] of the line card LC[2] and the external port P[1] of the line card LC[3]. In the LAG table 24, for example, {LAG 1} indicates the identifier (ID) of the LAG 1, and hereinafter, {AA} indicates the identifier (ID) of "AA" in this specification. Also, the example of the LAG table 24 in FIG. 2 shows that the external port P[1] of the line card LC[2] is assigned to the distribution ID=1 and the external port P[1] of the line card LC[3] is assigned to the distribution ID=2.

In the configuration like this, the relay device SW of FIG. 2 sets the MEP 1 to the LAG 1 and sets the MEP 2 to the port P[n] of the line card LC[4]. Here, the case where the relay device SW of FIG. 2 is the relay device SW1 of FIG. 1 is taken as an example, and the case where the MEP 1 corresponds to the MEP 14 of FIG. 1 and the MEP 2 corresponds to the MEP 12 of FIG. 1 is assumed. In this case, the external ports P[1] of the line card LC[2] and the line card LC[3] serving as the member ports of the LAG 1 are connected to the relay device SW4 through the communication lines (for example, Ethernet lines) 22, respectively. Also, the external port P[n] of the line card LC[4] is connected to the relay device SW2 through the communication line 22.

The OAM processing unit 23 of the management card MC[1] generates a CCM frame (first monitoring frame) CFo1 when monitoring the continuity between the MEP 1 (that is, member port of LAG 1) and the outside of the device (MEP 41 of relay device SW4). Then, the OAM processing unit 23 transmits the generated CCM frame CFo1 to the line cards (LC[2] and LC[3]) having the member ports of the LAG 1. At this time, in the first embodiment, the GAM processing unit 23 selects one line card from the line cards LC[2] and LC[3] having the member ports of the LAG 1, and transmits the CCM frame CFo1 to the selected line card (here, LC[2]).

Concretely, the OAM processing unit 23 adds a port identifier (here, {LC[2]}/{P[1]}) indicating any one external port in the member ports of the LAG 1 to the CCM frame CFo1 and transmits the frame to the line card (LC[2]) corresponding to the port identifier at regular intervals. At this time, the OAM processing unit 23 selects the port identifier to be added to the CCM frame CFo1 based on the LAG table 24.

On the other hand, one line card having the member port of the LAG 1 (here, LC[2]) transmits the CCM frame CFo1 received from the management card MC[1] at regular intervals to the outside of the device (opposite MEP) from its own external port (P[1]) set as the member port of the LAG 1. Note that the external port which transmits the CCM frame CFo1 may be fixed to any one of the member ports of the LAG 1 or may be sequentially changed among the member ports of the LAG 1. In the latter case, the OAM processing unit 23 alternately transmits the CCM frame CFo1 to the line cards LC[2] and LC[3] at each transmission interval. When the OAM processing unit 23 transmits the frame to the line card LC[3], it adds the port identifier {LC[3]}/{P[1]} to the CCM frame CFo1.

Also, when each of the line cards LC[2] and LC[3] having the member ports of the LAG 1 receives a CCM frame (second monitoring frame) directed to the MEP 1 from the outside of the device at its own external port set as the member port of the LAG 1, it transmits the CCM frame to the management card MC[1]. More specifically, when the line card LC[2] receives the CCM frame (second monitoring frame) CFi1 at its own external port P[1], it transmits the CCM frame CFi1 to the management card MC[1]. Similarly, when the line card LC[3] receives the CCM frame (second monitoring frame) CFi2 at its own external port P[1], it transmits the CCM frame CFi2 to the management card MC[1].

When the OAM processing unit 23 of the management card MC[1] receives either the CCM frame CFi1 or the CCM frame CFi2 within a predetermined period, it determines that there is the continuity between the MEP 1 and the opposite MEP. On the other hand, when the OAM processing unit 23 receives neither the CCM frame CFi1 nor the CCM frame CFi2 within a predetermined period, it determines that there is no continuity between the MEP 1 and the opposite MEP (that is, the opposite MEP is in a LOC state). In this case, the OAM processing unit 23 transmits the CCM (with RDI) frame as the CCM frame CFo1.

Like the case of the MEP 1 described above, when the OAM processing unit 23 of the management card MC[1] monitors the continuity between the MEP 2 (that is, the external port P[n] not set as the member port of the LAG) and the outside of the device (MEP 21 of the relay device SW2), it generates a CCM frame (third monitoring frame) CFo2.

At this time, the OAM processing unit 23 adds a port identifier {LC[4]}/{P[n]} to the CCM frame CFo2.

Then, the OAM processing unit 23 transmits the CCM frame CFo2, to which the port identifier has been added, to the line card LC[4]. The line card LC[4] transmits the CCM frame CFo2 from the external port P[n] to the outside of the device (opposite MEP) based on the port identifier. On the other hand, when the line card LC[4] receives a CCM frame CFi3 directed to the MEP 2 from the outside of the device at the external port P[n], it transmits the CCM frame CFi3 to the management card MC[1]. The OAM processing unit 23 determines the presence or absence of the continuity between the MEP 2 and the opposite MEP based on the reception state of the CCM frame CFi3.

<<Configuration and Operation of Line Card>>

Figure 3:
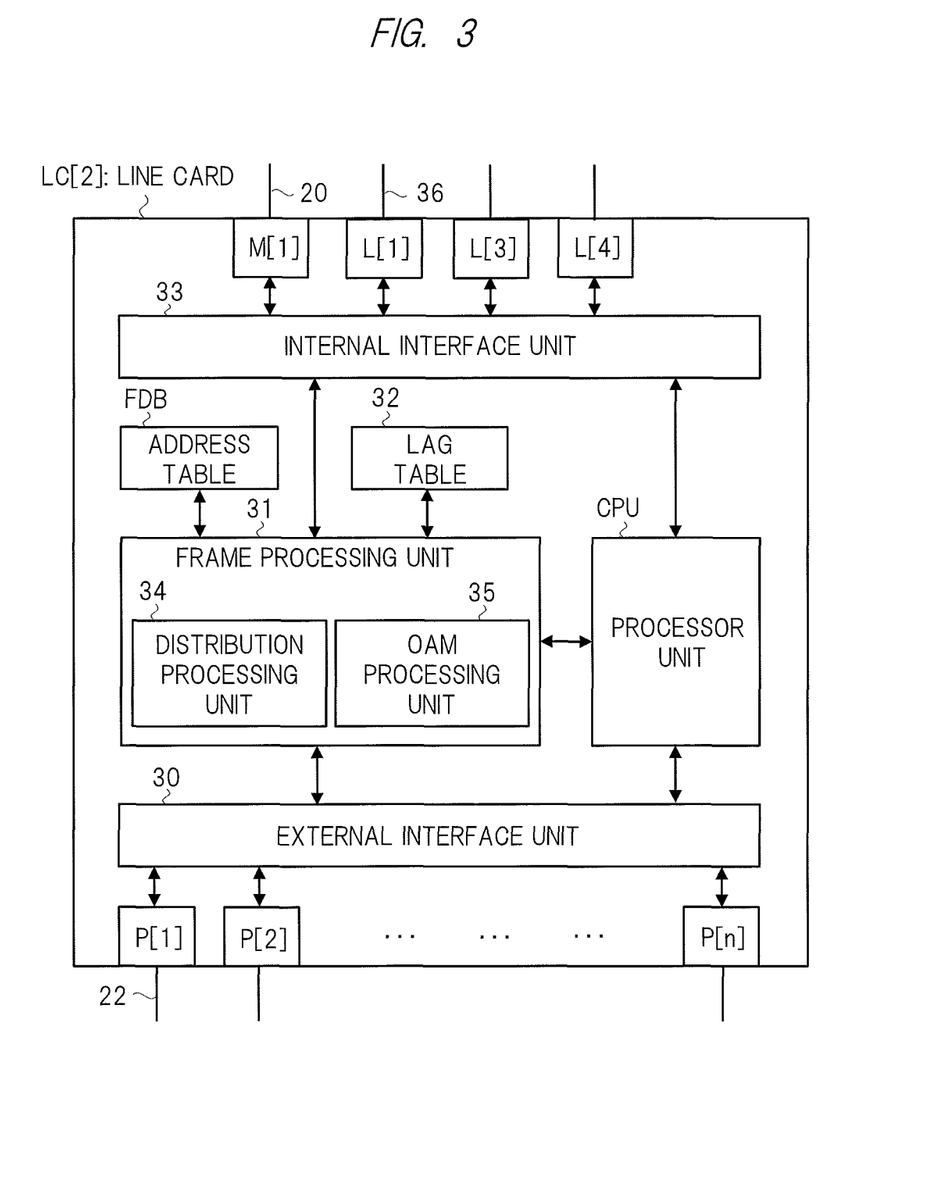
FIG. 3 is a block diagram showing a schematic configuration example of a line card in the relay device of FIG. 2.
Figure 4:
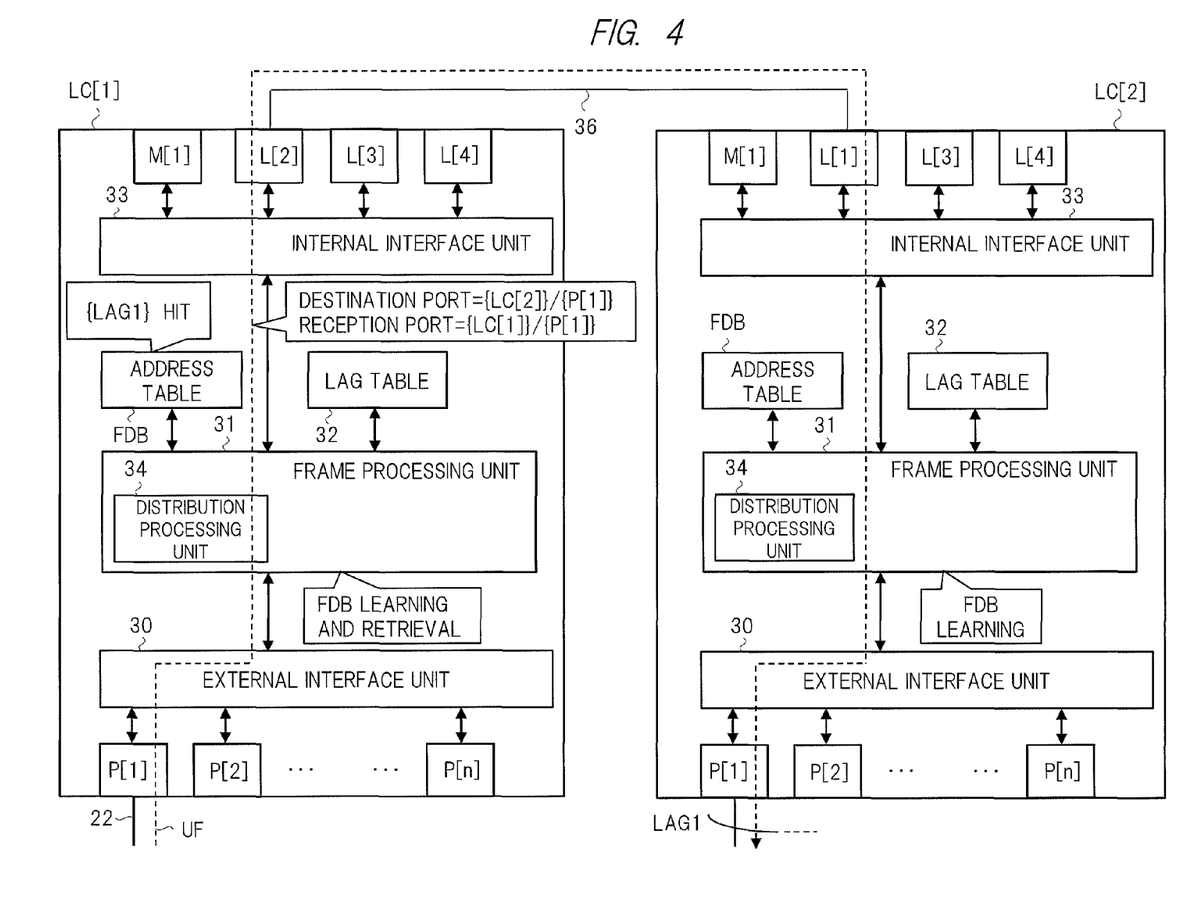
FIG. 4 is an explanatory diagram showing an operation example to a user frame in the relay device of FIG. 3.
Figure 5:
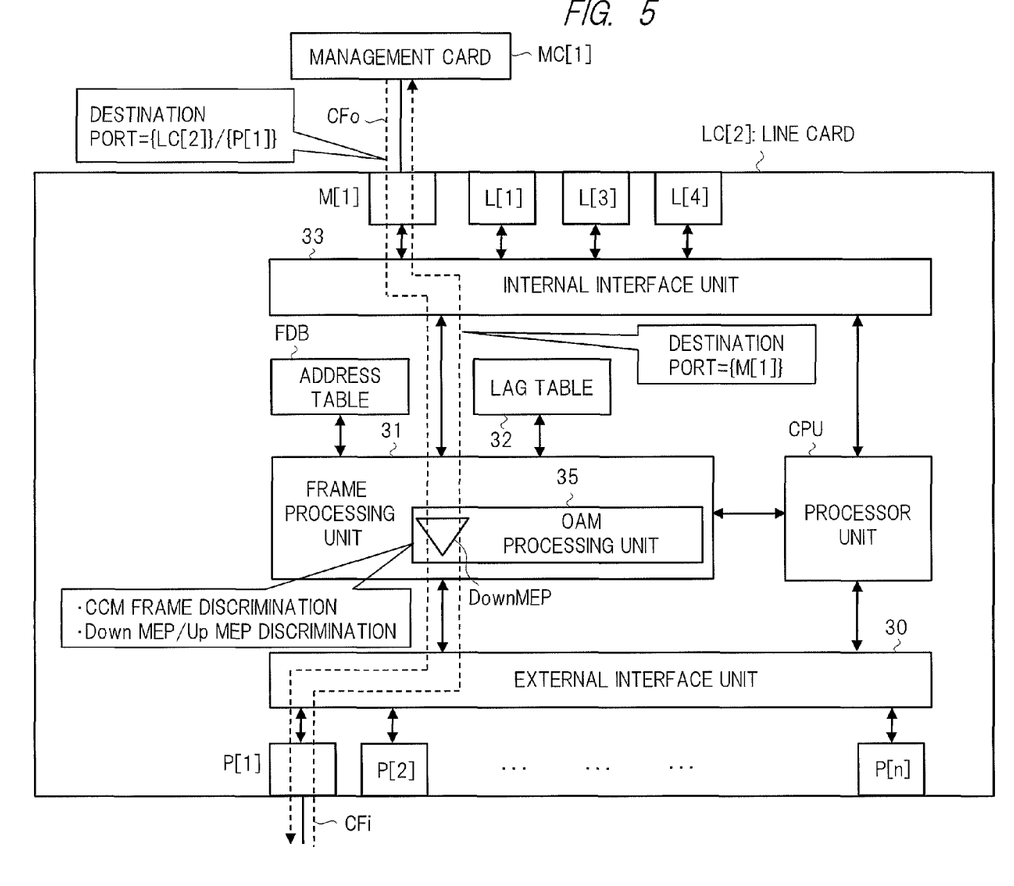
FIG. 5 is an explanatory diagram showing an operation example to a CCM frame in the relay device of FIG. 3.

FIG. 3 is a block diagram showing a schematic configuration example of a line card in the relay device of FIG. 2. FIG. 4 is an explanatory diagram showing an operation example to a user frame in the relay device of FIG. 3 and FIG. 5 is an explanatory diagram showing an operation example to a CCM frame in the relay device of FIG. 3.

The line card (for example, LC[2] of FIG. 2) shown in FIG. 3 includes a plurality of external ports P[1] to P[n], an external interface unit 30, a frame processing unit 31, a processor unit CPU, an address table FDB, a LAG table 32, an internal interface unit 33 and a plurality of internal ports. The plurality of internal ports include a management card port M[1] and line card ports L[1], L[3] and L[4].

As shown in FIG. 2, the management card port M[1] is connected to the management card MC[1] through the communication line 20. The line card ports L[1], L[3] and L[4] are connected to the line cards LC[1], LC[3] and LC[4], respectively, through the communication lines 36 corresponding to the communication path 21 of FIG. 2. The communication lines 20 and 36 are provided in a circuit board (back plane) in which slots for attaching and detaching each card are mounted. When the relay device SW is provided with a fabric card, a fabric card port is provided instead of the line card port.

The external interface unit 30 transmits and receives frames (for example, user frame and CCM frame) to and from the plurality of external ports P[1] to P[n]. The internal interface unit 33 transmits and receives frames (for example, user frame and CCM frame) to and from the plurality of internal ports (M[1], L[1], L[3] and L[4]).

When the external interface unit 30 receives the frame at any one of the plurality of external ports P[1] to P[n], it adds a port identifier of the external port which has received the frame (referred to as reception port identifier) to the frame, and transmits the frame to the frame processing unit 31. Also, when the external interface unit 30 receives the frame, to which a destination port identifier indicating the destination external port has been added, from the frame processing unit 31, it transmits the frame to the external port indicated by the destination port identifier. Note that each of the reception port identifier and the destination port identifier is made up of the identifier of the line card and the identifier of the external port.

The frame processing unit 31 includes a distribution processing unit 34 and an OAM processing unit 35 and mainly functions to relay a frame. When the frame processing unit 31 receives a user frame from the external interface unit 30, it learns a source MAC address of the user frame to the address table FDB in association with the reception port identifier added to the user frame. At this time, when the reception port identifier is the member port of the LAG based on the LAG table 32, the frame processing unit 31 changes the reception port identifier added to the user frame to the LAG identifier and learns the address table FDB by using the LAG identifier. Note that the LAG table 32 retains the same information as that of the LAG table 24 shown in FIG. 2.

Also, when the frame processing unit 31 receives the user frame from the external interface unit 30, it retrieves the port identifier corresponding to the destination MAC address of the user frame from the address table FDB, and adds the port identifier to the user frame as the destination port identifier. At this time, the LAG identifier is acquired as the destination port identifier in some cases. In this case, the distribution processing unit 34 of the frame processing unit 31 selects one external port from the member ports of the LAG with reference to the LAG table 32 based on a predetermined distribution rule, and sets the port identifier of the selected external port as the destination port identifier.

When the destination port identifier indicates the line card of the frame processing unit 31 itself, the frame processing unit 31 transmits the user frame to the external interface unit 30. On the other hand, when the destination port identifier indicates the other line card, the frame processing unit 31 transmits the user frame to the internal interface unit 33.

Further, when the frame processing unit 31 receives the user frame, to which the reception port identifier and the destination port identifier have been added, from the internal interface unit 33, the frame processing unit 31 learns the source MAC address of the user frame to the address table FDB in association with the reception port identifier. The frame processing unit 31 transmits the user frame to the external interface unit 30, and the external interface unit 30 transmits the user frame to the external port corresponding to the destination port identifier added to the user frame.

FIG. 4 shows an operation example in the case where a user frame UF received at the external port P[1] of the line card LC[1] is relayed to the external port P[1] (member port of LAG 1) of the line card LC[2]. The external interface unit 30 of the line card LC[1] adds the reception port identifier {LC[1]}/{P[1]} to the user frame UF and transmits it to the frame processing unit 31. The frame processing unit 31 learns the source MAC address of the user frame UF to the address table FDB in association with the reception port identifier {LC[1]}/{P[1]}.

Further, the frame processing unit 31 retrieves the port identifier corresponding to the destination MAC address of the user frame UF from the address table FDB, thereby acquiring the LAG identifier {LAG 1}. The distribution processing unit 34 selects one external port from the member ports of the LAG 1, adds the destination port identifier (here, {LC[2]}/{P[1]}) indicating the selected external port to the user frame UF, and transmits it to the internal interface unit 33. The internal interface unit 33 relays the user frame UF to the line card LC[2] through the line card port L[2] and the communication line 36 based on the destination port identifier.

The internal interface unit 33 of the line card LC[2] transmits the user frame UF from the line card LC[1] received at the line card port L[1] to the frame processing unit 31. The frame processing unit 31 learns the source MAC address of the user frame UF to the address table FDB in association with the reception port identifier {LC[1]}/{P[1]} added to the user frame UF. The frame processing unit 31 transmits the user frame UF to the external interface unit 30, and the external interface unit 30 transmits the user frame UF to the external port P[1] based on the destination port identifier {LC[2]}/{P[1]} added to the user frame UF.

Also, in FIG. 3, the GAM processing unit 35 in the frame processing unit 31 performs various processes involved in the Ethernet OAM typified by the discrimination of the CCM frame. FIG. 5 shows an operation example in the case where the MEP is a Down MEP. Also in FIG. 2, the case where the MEP 1 and the MEP 2 are Down MEPs is taken as an example. The Down MEP is a MEP which mainly sets a path directed from the external port to the outside of the device as a monitoring section, and the Up MEP is a MEP which sets also a relay path inside the device as a monitoring section in addition to the path mentioned above.

In FIG. 5, the management card MC[1] generates the CCM frame CFo whose destination is the opposite MEP, adds the destination port identifier {LC[2]}/{P[1]} to the frame and transmits the frame to the line card LC[2]. The CCM frame CFo contains, for example, the source MAC address corresponding to the MEP 1 of FIG. 2, the destination MAC address corresponding to the opposite MEP (multicast address or unicast address), a predetermined frame identifier indicating the CCM frame, the MEP identifier corresponding to the MEP 1 and a MEG level.

The internal interface unit 33 of the line card LC[2] transmits the CCM frame CFo received at the management card port M[1] to the frame processing unit 31. The OAM processing unit 35 of the frame processing unit 31 recognizes the CCM frame CFo and discriminates the Down MEP/Up MEP based on the frame identifier and others. Though not particularly limited, the OAM processing unit 35 discriminates the Down MEP/Up MEP based on the MEP identifier and the MEG level. In this example, the discrimination result is the Down MEP. In this case, the OAM processing unit 35 transmits the CCM frame CFo to the external interface unit 30. The external interface unit 30 transmits the CCM frame CFo to the external port P[1] based on the destination port identifier {LC[2]}/{P[1]} added to the CCM frame CFo.

Regarding the reverse direction thereof, when the external interface unit 30 of the line card LC[2] receives the CCM frame CFi from the opposite MEP at the external port P[1], the external interface unit 30 adds the reception port identifier {LC[2]}/{P[1]} to the CCM frame CFi and transmits it to the frame processing unit 31. The OAM processing unit 35 recognizes the CCM frame CFi and discriminates the Down MEP/Up MEP based on, for example, the frame identifier and the destination MAC address of the CCM frame CFi.

Though not particularly limited, the OAM processing unit 35 discriminates the Down MEP/Up MEP based on the MEP identifier and the MEG level contained in the CCM frame CFi. In this example, the discrimination result is the Down MEP. In this case, the OAM processing unit 35 adds the destination port identifier {M[1]} to the CCM frame CFi and transmits it to the internal interface unit 33. The internal interface unit 33 transmits the CCM frame CFi to the management card MC[1] based on the destination port identifier {M[1]}.

Here, the operation in the case where the MEP is the Up MEP will be briefly described. As an example, the case where the Up MEP is set to the external port P[n] of the line card LC[1] of FIG. 2 and the opposite MEP is present ahead of the external port P[1] of the line card LC[4] is assumed. In this case, like the case of FIG. 5, the CCM frame is transmitted from the management card MC[1] to the external port P[1] of the line card LC[1]. Here, the OAM processing unit 35 of the line card LC[1] discriminates that the MEP is the Up MEP. In this case, though not particularly limited, the OAM processing unit 35 retrieves the destination port corresponding to the destination MAC address of the CCM frame from the address table FDB, and relays the CCM frame to the destination port (LC[4]/P[1]) like the case of the user frame.

Also, regarding the reverser direction thereof, the OAM processing unit 35 of the line card LC[4] receives the CCM frame at the external port P[1]. The OAM processing unit 35 recognizes that the destination MEP of the CCM frame is not the MEP set to its own line card based on the MEP identifier and the MEG level contained in the CCM frame. In this case, the OAM processing unit 35 handles the CCM frame as a user frame, retrieves the destination port corresponding to the destination MAC address of the CCM frame from the address table FDB, and relays the CCM frame to the destination port (LC[1]/P[n]) obtained as a result of the retrieval. The OAM processing unit 35 of the line card LC[1] receives the CCM frame, recognizes that the destination of the CCM frame is the Up MEP set to its own line card based on the MEP identifier and the MEG level thereof, and transmits the CCM frame to the management card MC[1] instead of the destination port (LC[1]/P[n]).

The processor unit CPU of FIG. 3 performs the software process to the frame, which is difficult to be processed by the frame processing unit 31 (that is, hardware), in cooperation with the frame processing unit 31, or manages its own line card. Concretely, the processor unit CPU performs various frame processes such as the IP multicast process and the frame filtering, manages various setting information of its own line card and the failure status inside the device, and controls various redundant protocols.

Outline of Relay Device (Comparative Example)

Figure 8:
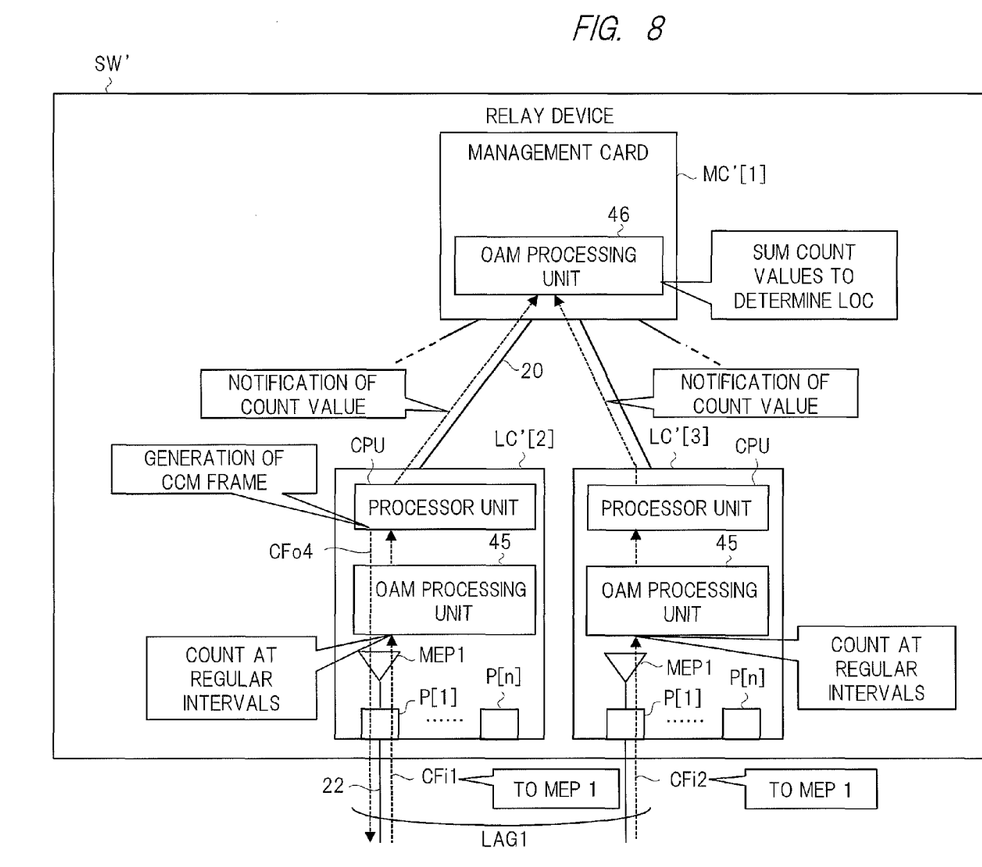
FIG. 8 is a schematic diagram showing a configuration example and an operation example of a relay device serving as a comparative example to the relay device of FIG. 2.

FIG. 8 is a schematic diagram showing a configuration example and an operation example of a relay device serving as a comparative example to the relay device of FIG. 2. In a relay device SW' of FIG. 8, unlike the configuration in which the process of the Ethernet OAM is performed mainly by the management card as shown in FIG. 2, the process of the Ethernet OAM is performed mainly by each line card. In FIG. 8, the processor unit CPU provided in one predetermined line card LC (here, LC'[2]) out of the line cards LC'[2] and LC'[3] to which the LAG 1 across line cards is set generates a CCM frame CFo4 and transmits it to the outside of the device through the OAM processing unit 45.

On the other hand, the CCM frames CFi1 and CFi2 which the line cards LC'[2] and LC'[3] have received by the LAG 1 from the outside of the device are transmitted to the OAM processing units 45 of the line cards LC'[2] and LC'[3], respectively. The OAM processing units 45 of the line cards LC'[2] and LC'[3] count the number of receptions of the CCM frames CFi1 and CFi2, respectively, at regular intervals under the control of the processor unit CPU. The processor units CPU of the line cards LC'[2] and LC'[3] notify the management card MC'[1] of the count values by the OAM processing units 45 at regular intervals.

The OAM processing unit 46 of the management card MC'[1] sums the count values notified from the line cards LC'[2] and LC'[3], and determines the presence or absence of the continuity based on this summing result (LOC state or not). More specifically, the opposite MEP outside the device transmits the CCM frame to the LAG 1, to which the MEP 1 is set, at predetermined transmission intervals. Consequently, if the uniform load distribution is carried out to the LAG 1, each member port (each of LC'[2]/P[1] and LC'[3]/P[1]) of the LAG 1 receives the CCM frame at intervals twice as long as the transmission interval. However, the uniform load distribution is not always carried out. Therefore, in each of the line cards LC'[2] and LC'[3], the presence or absence of the continuity cannot be determined, and it has to be determined by the management card MC'[1].

Here, for example, when the LOC state is determined by the OAM processing unit 46 of the management card MC'

[1], it is necessary to transmit the CCM (with RDI) frame to the opposite MEP. Therefore, the OAM processing unit 46 needs to notify the monitoring result of the continuity to the processor unit CPU of each of the line cards LC'[2] and LC'[3] to be the generation source of the CCM frame.

Effects of Present Embodiment

As described above, by using the relay device of the first embodiment shown in FIG. 2 and others, for example, when compared with the case of FIG. 8, the processing load in each line card can be reduced, and as a result, the increase of the monitoring points (that is, MEPs) based on the Ethernet OAM can be achieved. Concretely, when it is desired to increase the accommodation capacity of external devices in each line card (for example, it is desired to increase the number of external ports), it is also desired to increase the number of MEPs to be set correspondingly.

In such a circumstance, in the comparative example of FIG. 8, the process of the Ethernet OAM as well as the general frame relaying process is performed mainly by each line card. Therefore, in each line card, the processing load involved in the frame relaying process increases as the accommodation capacity of the external devices is increased, and the processing load involved in the process of the Ethernet OAM also increases as the number of MEPs to be set is increased. Consequently, under the condition where the processing capacity of each line card is limited, for example, the case where the accommodation capacity of the external devices can be increased but it is difficult to increase the number of MEPs to be set may occur.

In particular, as described with reference to FIG. 3, the processor unit CPU of each line card needs to perform the complicated process, which is difficult to be processed by hardware, as the frame relaying process. In addition, in the comparative example of FIG. 8, the processor unit CPU of each line card needs to perform such processes as the regular generation of CCM frames, the regular notification of the count value to the management card MC[1] and the reflection of the monitoring result notified from the management card MC[1], as the processes of the Ethernet OAM. As a result, in the comparative example of FIG. 8, in particular, the case where the number of MEPs to be set is limited due to the restriction of the resource of the processor unit CPU may occur.

On the other hand, in the relay device of FIG. 2 and FIG. 3, the process of the Ethernet OAM is performed mainly by the management card, and the processing load required for the process of the Ethernet OAM in each line card is very small when compared with the case of FIG. 8. In particular, since the processor unit CPU of each line card does not need to perform such processes as the regular generation of the CCM frame and the regular notification of the count value unlike the case of FIG. 8, the problem of the resource shortage can be solved. Also, by performing the process of the Ethernet OAM, in which the external port which is not set as the member port of the LAG serves as the MEP like the line card LC[4] of FIG. 2, mainly by the management card, the processing load of the processor unit CPU in each line card can be further reduced.

As a result, it is possible to increase the number of MEPs to be set. Furthermore, in the management card MC[1], the presence or absence of the continuity can be determined without the process of summing the count values unlike the case of FIG. 8, so that the process can be simplified. Also, since the process of the Ethernet OAM is performed mainly by the management card MC[1], the monitoring result thereof is naturally collected in the management card MC[1]. Therefore, for example, compared with the case where the monitoring is performed by each line card and the monitoring result is notified to the management card MC[1], the process becomes more efficient.

Second Embodiment

Outline of Relay Device (Modified Example)

Figure 6:
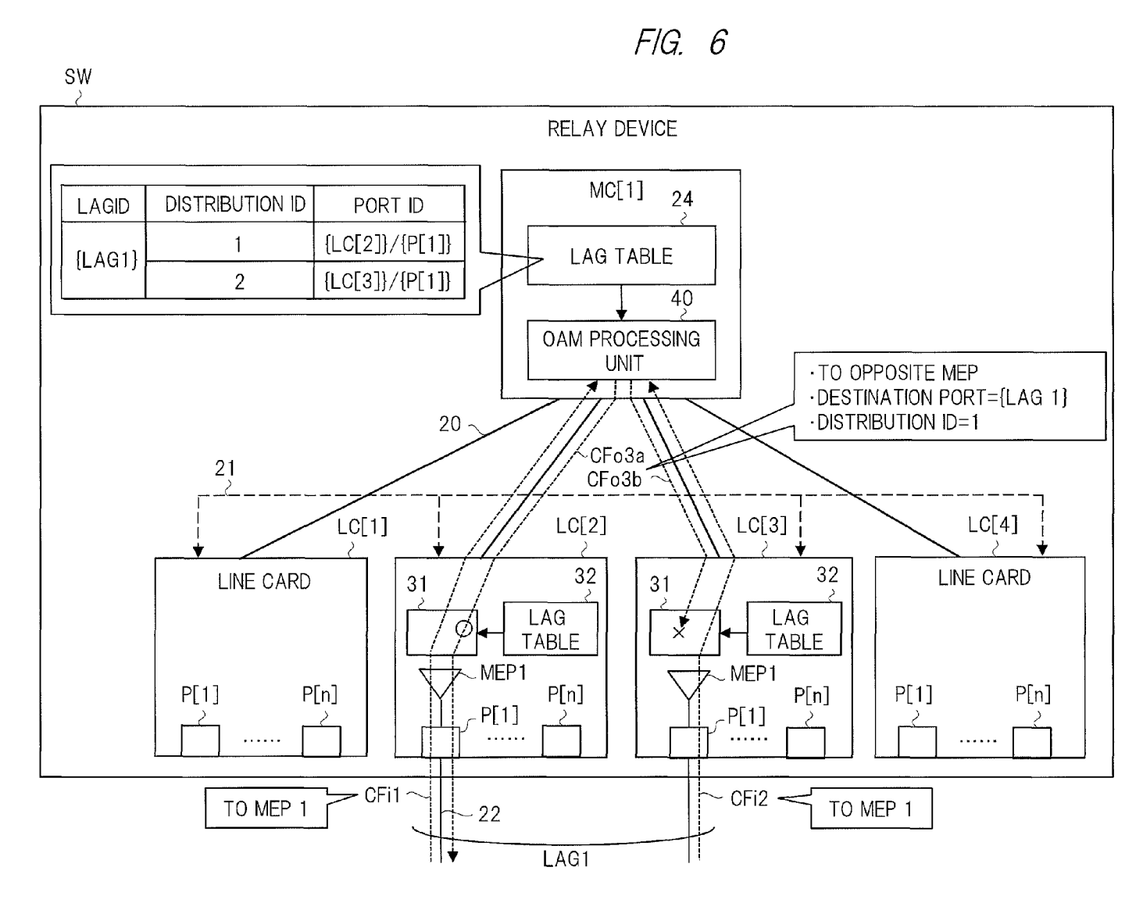
FIG. 6 is a schematic diagram showing a configuration example and an operation example of a relay device according to the second embodiment of the present invention.

FIG. 6 is a schematic diagram showing a configuration example and an operation example of a relay device according to the second embodiment of the present invention. The relay device (switching device) SW shown in FIG. 6 has the same configuration as that of the relay device shown in FIG. 2 (and FIG. 3), but is slightly different from the relay device shown in FIG. 2 (and FIG. 3) in the processing method of the Ethernet OAM. Hereinafter, the description will be made while focusing on the different point.

In FIG. 6, the OAM processing unit 40 of the management card (first card) MC[1] generates the CCM frame like the case of FIG. 2. However, the OAM processing unit 40 transmits the generated CCM frame to all of the line cards LC[2] and LC[3] having the member ports of the LAG 1 unlike the case of FIG. 2. Here, the OAM processing unit 40 generates a CCM frame (first monitoring frame) CFo3a and transmits it to the line card LC[2]. Further, the OAM processing unit 40 generates a CCM frame (first monitoring frame) CFo3b and transmits it to the line card LC[3].

At this time, the OAM processing unit 40 determines the LAG identifier (ID) and the distribution identifier (ID) based on the LAG table 24. Then, the OAM processing unit 40 adds the determined LAG identifier {LAG 1} and distribution identifier (here, "1") to each of the generated CCM frames (first monitoring frames) CFo3a and CFo3b, and transmits the CCM frames CFo3a and CFo3b, to which each of the identifiers has been added, to the line cards LC[2] and LC[3].

Each of the line cards LC[2] and LC[3] includes the frame processing unit 31 and the LAG table 32 as shown in FIG. 3. The frame processing unit 31 (for example, OAM processing unit 35 of FIG. 3) of each of the line cards LC[2] and LC[3] determines whether the transmission of the CCM frame is necessary or not based on the LAG table 32 and the LAG identifier and the distribution identifier added to the CCM frames CFo3a and CFo3b in addition to performing the various processes described with reference to FIG. 3 and FIG. 5.

Concretely, the frame processing unit 31 (OAM processing unit 35) refers to the LAG table 32 based on the LAG identifier {LAG 1} added to the CCM frames CFo3a and CFo3b. Then, the frame processing unit 31 (OAM processing unit 35) determines that the transmission of the CCM frame is necessary when the distribution identifier assigned preliminarily to its own external port which is set as the member port of the LAG 1 coincides with the distribution identifier added to the CCM frames CFo3a and CFo3b, and transmits the CCM frame to the outside of the device from its own external port.

Here, the distribution identifier added to the CCM frames CFo3a and CFo3b is "1", and the member port corresponding to the distribution identifier "1" is the external port P[1] of the line card LC[2] based on the LAG table 32. Therefore, the line card LC[2] determines that the transmission is necessary, and transmits the CCM frame CFo3a to the outside of the device from the external port P[1]. On the other hand, the line card LC[3] determines that the transmission is unnecessary, and discards the CCM frame FCo3b.

Note that the operation in the case where the CCM frames CFi1 and CFi2 are received from the outside of the device is the same as that of the case of FIG. 2. Also, the distribution identifier added to the CCM frames CFo3a and CFo3b may be constantly fixed or sequentially changed. In the latter case, for example, the distribution identifier is alternately set to "1" and "2" at each transmission interval of the CCM frame.

Here, in the case of the example shown in FIG. 4, if a mishit occurs in the retrieval result of the address table FDB in the line card LC[1], the flooding can be performed in the same mechanism as the case of the Patent Document 1. Concretely, the line card LC[1] adds a distribution identifier to the user frame for flooding and transmits the user frame to each of the line cards LC[2] and LC[3] to which the LAG 1 across the devices is set. Each of the line cards LC[2] and LC[3] determines whether the transmission of the user frame is necessary based on the distribution identifier and the LAG table 32. In the case of the configuration having the mechanism of the flooding like this, the operation described with reference to FIG. 6 can be readily achieved by using this mechanism.

As described above, also by using the relay device of the second embodiment, various effects as described in the first embodiment can be achieved. When the method of FIG. 2 and the method of FIG. 6 are compared, in the case where the number of LAGs to which the MEP is set and the number of member ports constituting each LAG are large, there is a threat that the band of the communication line 20 is consumed due to the CCM frames transmitted from the management card MC[1]. Therefore, from this viewpoint, the method of FIG. 2 is more desirable.

Third Embodiment

Outline of Relay Device (Applied Example)

Figure 7:
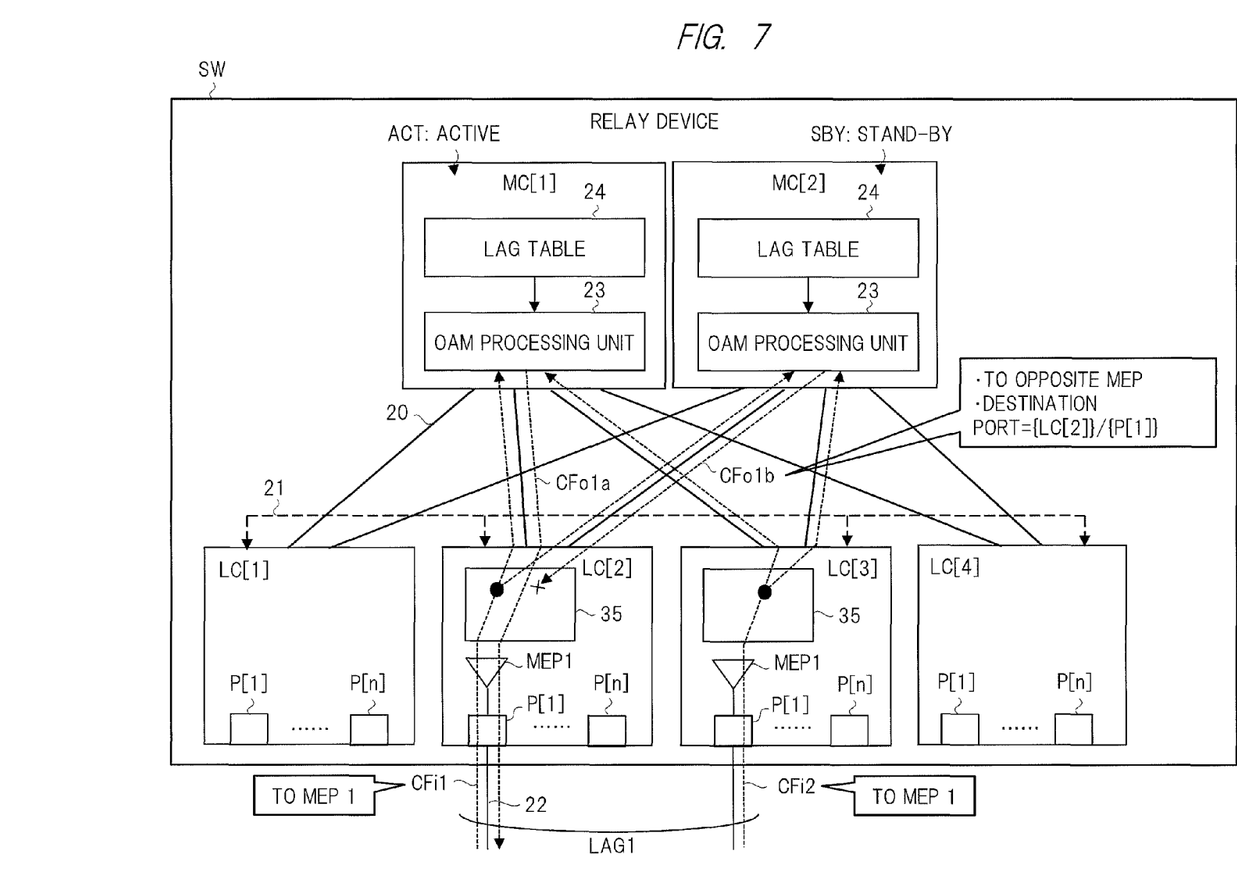
FIG. 7 is a schematic diagram showing a configuration example and an operation example of a relay device according to the third embodiment of the present invention.

FIG. 7 is a schematic diagram showing a configuration example and an operation example of a relay device according to the third embodiment of the present invention. The relay device (switching device) SW shown in FIG. 7 has the same configuration as that of the relay device shown in FIG. 2 (and FIG. 3), and it further includes a management card MC[2]. Hereinafter, the description will be made while focusing on the different point from FIG. 2 (and FIG. 3).

The management card MC[2] is connected to the plurality of line cards LC[1] to LC[4] through the management communication lines 20 like the management card MC[1]. In the example of FIG. 7, the management card MC[1] is in an active state ACT, and the management card MC[2] is in a stand-by state SBY. The management card in the active state ACT takes the predetermined function as the management card. When a failure occurs in the management card MC[1] in the active state ACT, the management card MC[2] in the stand-by state SBY makes a transition to the active state ACT instead of the management card MC[1].

In FIG. 7, the communication of the CCM frame between the management card MC[1] and the line cards LC[2] and LC[3] to which the LAG across the devices is set is performed in the same manner as that of the case of FIG. 2 (and FIG. 3). However, at this time, the GAM processing unit 35 of the line cards LC[2] and LC[3] transmits the CCM frames CFi1 and CFi2 received by the LAG 1 also to the management card MC[2] in addition to the management card MC[1].

Also, the management card MC[2] generates the CCM frame independently of the management card MC[1] in the same manner as that of the management card MC[1], and transmits the CCM frame to the same line card (here, line card LC[2]) as that of the management card MC[1]. At this time, the management card MC[2] adds the destination port identifier {LC[2]}/{P[1]} to the CCM frame like the case of the management card MC[1]. In the example of FIG. 7, the management card MC[1] transmits the CCM frame CFo1a to the line card LC[2] at regular intervals, and the management card MC[2] also transmits the CCM frame CFo1b to the line card LC[2] at regular intervals.

Here, the GAM processing unit 35 of the line card LC[2] selects one of the received CCM frames CFo1a and CFo1b, and transmits the selected CCM frame to the external port P[1]. At this time, the GAM processing unit 35 selects the CCM frame which has been transmitted from the management card in the active state ACT. Since the management card MC[1] is in the active state ACT in the example of FIG. 7, the GAM processing unit 35 selects the CCM frame CFo1a and discards the CCM frame CFo1b. Note that, when the management card MC[2] makes a transition to the active state ACT due to the failure in the management card MC[1], the GAM processing unit 35 selects the CCM frame CFo1b and discards the CCM frame CFo1a.

Therefore, each of the line cards LC[1] to LC[4] including the line card LC[2] has a function of recognizing which of the management cards is in the active state ACT (in other words, the presence or absence of the failure in the management card). Though not particularly limited, for example, this function is implemented by performing the continuity test using an internal monitoring frame between each of the line cards LC[1] to LC[4] and the management card MC[1] and between each of the line cards LC[1] to LC[4] and the management card MC[2] and sharing the test result among the respective cards.

In the case of the operation example shown in FIG. 7, it is recognized as if the transmission and the reception of the CCM frame are performed mainly by the management card MC[2] itself as well as the management card MC[1]. Consequently, the management cards MC[1] and MC[2] can substantially perform the process of the CCM frame always in synchronization with each other. As a result, for example, even when a failure occurs in a management card and another management card makes a transition to the active state ACT, the communication of the CCM frame can be continued without any interruption.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, in FIG. 7, the case where a plurality of management cards are mounted in the configuration of FIG. 2 is taken as an example, but of course, the same method as that shown in FIG. 7 can be applied also to the case where a plurality of management cards are mounted in the configuration of FIG. 6. Also, for example, in FIG. 2, the management card (first card) MC[1] includes the LAG table 24, but when the method in which the external port to transmit the CCM frame is always fixed is used, the management card MC[1] does not always have to include the LAG table 24. However, it is sometimes desired to change the external port to transmit the CCM frame to an external port of another line card when a failure occurs in the line card having the fixed external port. In such a case, the LAG table 24 is necessary.

Further, the process of the Ethernet OAM is performed by using the management card for managing a plurality of line cards, but the card to be used for the process of the Ethernet OAM is not limited to the management card. More specifically, it is also possible to perform the process of the Ethernet OAM by using a first card connected to each of the plurality of line cards. The first card is not limited to the management card and it may be, for example, a dedicated card for performing the process of the Ethernet OAM, a fabric card or others. However, when using the dedicated card, the hardware needs to be separately added, and when using the fabric card, the wide communication band secured for the user frame between the fabric card and the respective line cards needs to be further expanded. From these viewpoints, when the relay device preliminarily includes the management card, it is desirable to use the management card.

What is claimed is:

1. A relay device comprising:
a plurality of line cards each having one or plural external ports; and
a first card connected to each of the plurality of line cards,
wherein an external port of one of the plurality of line cards and an external port of the other one of the plurality of line cards are set as member ports of a same Link Aggregation Group (LAG),
when monitoring a continuity between the member ports of the LAG and an outside of the device, the first card generates a first monitoring frame and transmits the first monitoring frame to the line cards having the member ports of the LAG,
any one of the line cards having the member ports of the LAG transmits the first monitoring frame received from the first card to the outside of the device from its own external port set as the member port of the LAG, and
when the line cards having the member ports of the LAG receive a second monitoring frame from the outside of the device at their own external ports set as the member ports of the LAG, they transmit the received second monitoring frame to the first card,
wherein the first card is a management card which manages the plurality of line cards,
wherein the first monitoring frame and the second monitoring frame are Continuity Check Message (CCM) frames based on Ethernet OAM,
wherein the management card adds a port identifier, which indicates any one external port in the member ports of the LAG, to the first monitoring frame and transmits the first monitoring frame, to which the port identifier has been added, to a line card corresponding to the port identifier,
wherein the line card, which has received the first monitoring frame to which the port identifier has been added, transmits the first monitoring frame to the outside of the device from an external port indicated by the port identifier, and
wherein the management card includes a LAG table which retains a correspondence relation between the LAG and the member ports of the LAG, and adds the port identifier to the first monitoring frame based on the LAG table.

2. The relay device according to claim 1,
wherein the management card further generates a third monitoring frame when monitoring continuity between an external port which is not set as the member port of the LAG and the outside of the device, and transmits the third monitoring frame to the line card having the external port which is not set as the member port of the LAG.

3. A relay device comprising:
a plurality of line cards each having one or plural external ports; and
a first card connected to each of the plurality of line cards,
wherein an external port of one of the plurality of line cards and an external port of the other one of the plurality of line cards are set as member ports of a same Link Aggregation Group (LAG),
when monitoring a continuity between the member ports of the LAG and an outside of the device, the first card generates a first monitoring frame and transmits the first monitoring frame to the line cards having the member ports of the LAG,
any one of the line cards having the member ports of the LAG transmits the first monitoring frame received from the first card to the outside of the device from its own external port set as the member port of the LAG, and
when the line cards having the member ports of the LAG receive a second monitoring frame from the outside of the device at their own external ports set as the member ports of the LAG, they transmit the received second monitoring frame to the first card,
wherein the first card is a management card which manages the plurality of line cards,
wherein the management card adds a LAG identifier and a distribution identifier to the first monitoring frame and transmits the first monitoring frame, to which the LAG identifier and the distribution identifier have been added, to all line cards having the member ports of the LAG, and
each of the line cards, which has received the first monitoring frame to which the LAG identifier and the distribution identifier have been added, transmits the first monitoring frame to the outside of the device from its own external port when a distribution identifier preliminarily assigned to its own external port set as the member port of the LAG coincides with the distribution identifier added to the first monitoring frame.

* * * * *